UNITED STATES PATENT OFFICE.

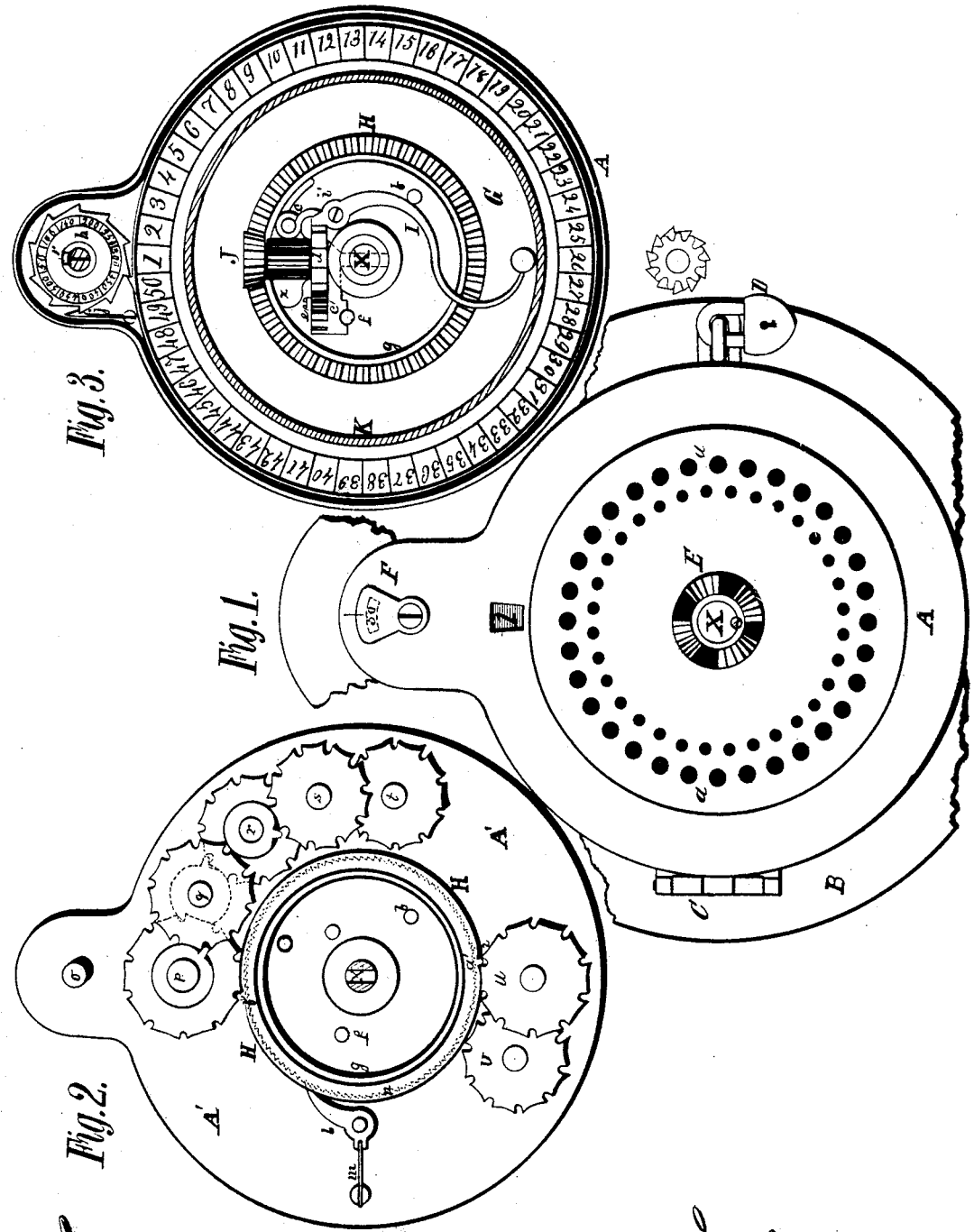

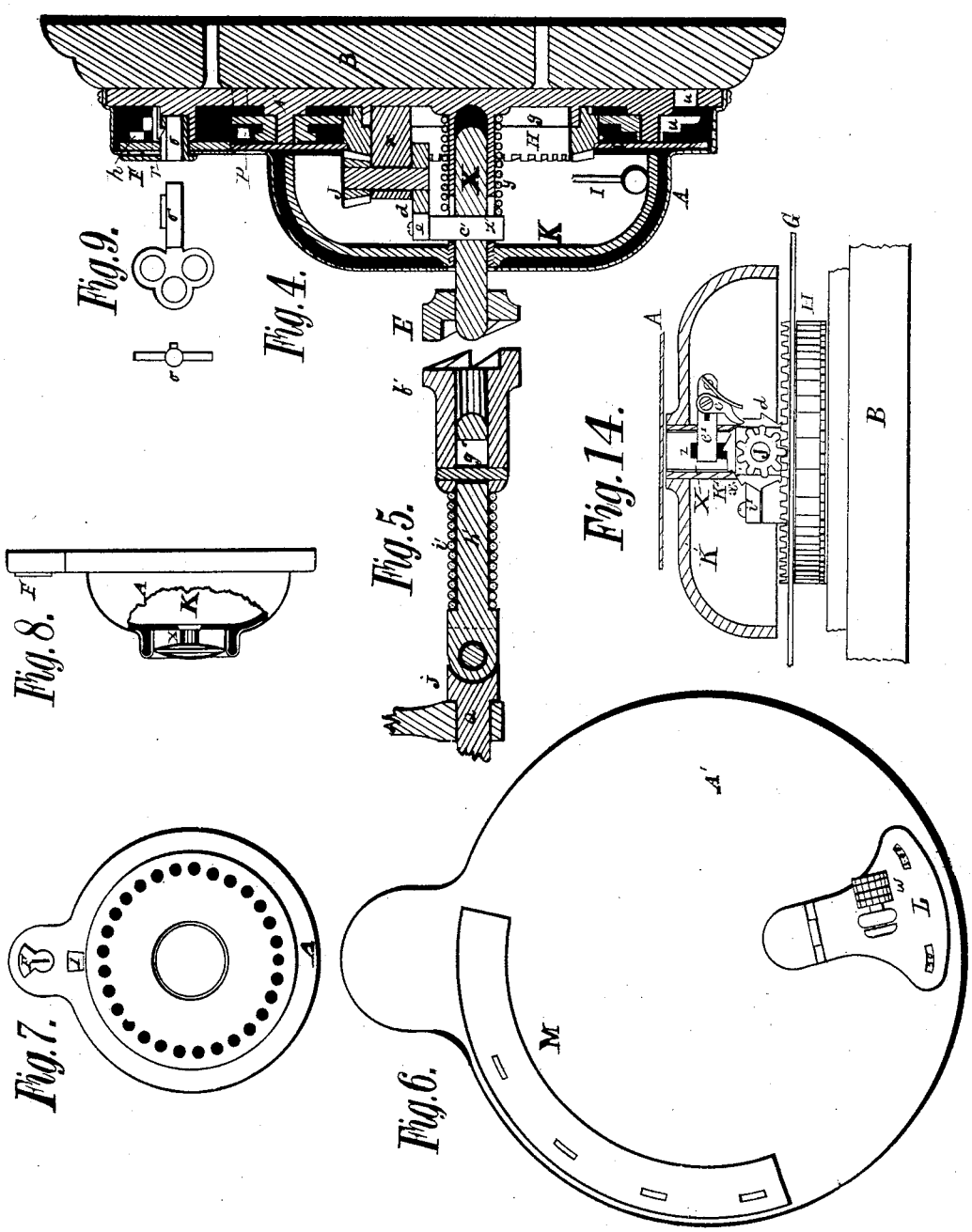

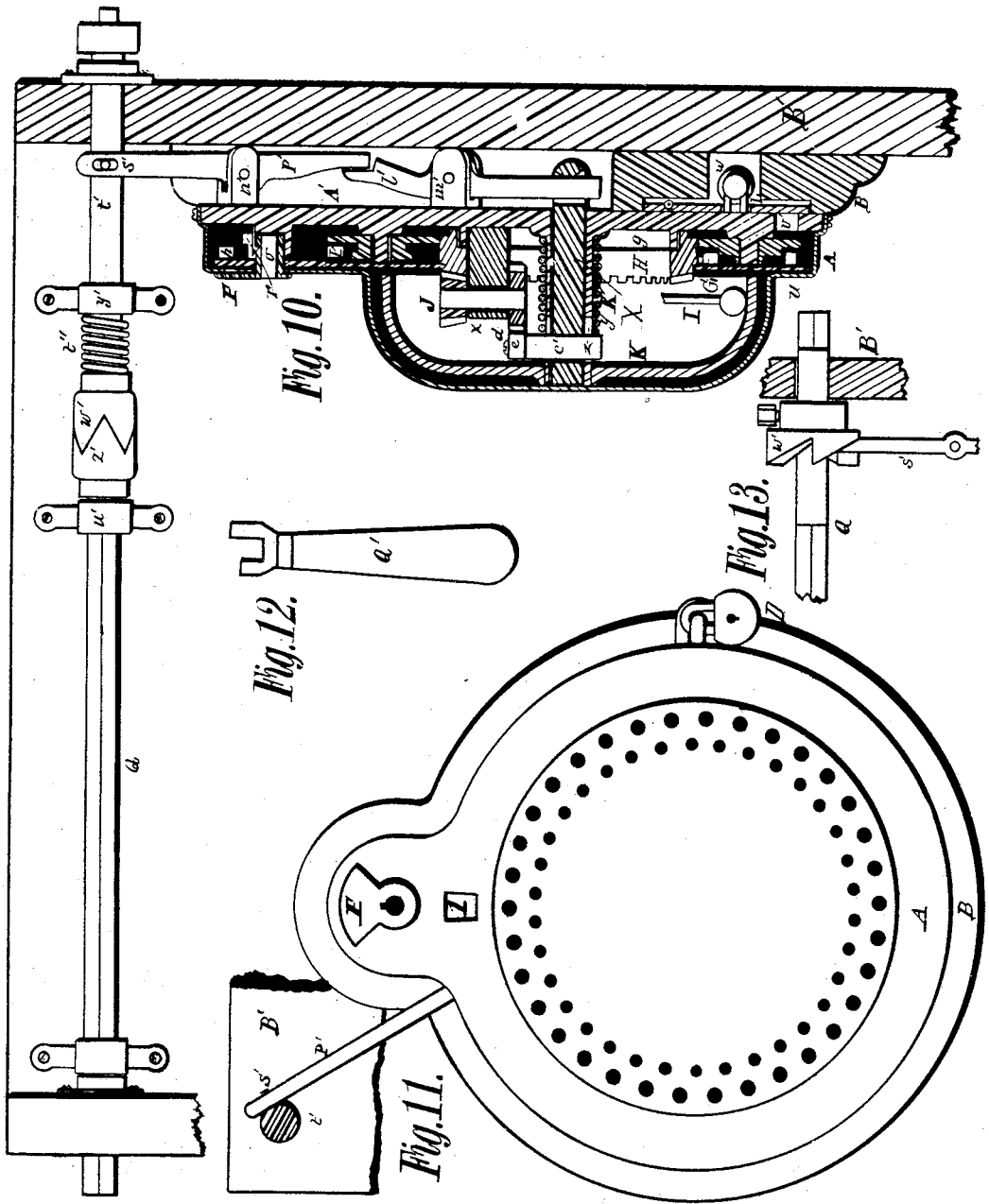

LEWIS B. HUNT AND JAMES PRESTON, OF NEW YORK, N. Y., ASSIGNORS TO ELIJAH H. AUSTIN, OF SAME PLACE.

IMPROVEMENT IN FARE-REGISTERS.

Specification forming part of Letters Patent No. 223,046, dated December 30, 1879; application filed July 24, 1879.

*To all whom it may concern:*

Be it known that we, LEWIS B. HUNT and JAMES PRESTON, both of the city, county, and State of New York, have invented certain new and useful Improvements in Registering Apparatus; and we declare the following to be a full and exact specification thereof.

Figure 1 is a front elevation of our invention. Fig. 2 is a view of the base of the register, showing the position of a train of recording-wheels. Fig. 3 is a sectional view, cutting through on a plane above the dial, and showing a part of the actuating mechanism. Fig. 4 represents a vertical section of the register, cutting through on a plane at right angles to Fig. 3. Fig. 5 is a broken sectional view of an actuating device for actuating the recording mechanism. Fig. 6 is a back view of the base of the register. Fig. 7 is a front view of a portable register, embracing the mechanism shown in the previous figures. Fig. 8 is a broken sectional side elevation of Fig. 7. Fig. 9 represents a key. Fig. 10 is a vertical section of a registering-machine, showing the interior mechanism thereof and actuating device. Fig. 11 represents a front view of Fig. 10 and cross-section of a reciprocating bar, Fig. 12 being an instrument for communicating motion to the same. Fig. 13 shows the actuating device in a modified form. Fig. 14 represents a detached sectional view, illustrating the actuating device, whereby the registering mechanism is moved.

Like letters designate corresponding parts in all the figures.

In Fig. 1, A represents the case or covering of the register; $a$, holes or perforations therein for the transmission of sound. E is a notched disk secured to the shaft X. B represents a base or support, of suitable material, to which the register is attached by means of the hinge C, and kept securely in place by the lock D. 1 is a numeral upon the dial beneath the outer covering, A. F is a cover-plate, for the purpose of concealing the number upon a revolving dial or counter, located beneath the outer covering. Said numbers are seen through an aperture in said covering when said cover-plate is removed to one side.

In Fig. 2, A represents the base of the register. $p\ q\ r\ s\ t$ are a series of disks, which are constructed on the principle of the Geneva stop-movement, the train being set in motion by means of a tooth projecting from the hub H. This hub is kept in position by the journal $g$, projecting from the base A'. The bottom of the hub is provided with a ratchet, $n$, with which the pawl $l$ engages, where it is held in position by the spring $m$. $v$ and $u$ are two disks for recording purposes, being actuated by the tooth $a'$ on the hub H.

In Fig. 3, A represents the case of the register in section, which is cut on a plane just above the dial G, and through the lower edge of the bell K. H is the hub, the top of which is provided with teeth, and is revolved by the beveled pinion J. The shaft of this pinion rests in the support $x$, and has fixed on its upper end a ratchet-wheel, $d$, which is provided with a corresponding number of teeth to those on the pinion. $e$ is a pawl, which engages with the ratchet-teeth. This pawl is screwed to a right-angle supporting-bar, $c'$, said bar being connected with the reciprocating shaft X. I is a lever turning upon the fulcrum $i$. The short arm of this lever engages with the teeth in the ratchet-wheel, and is kept in contact therewith by the spring $c$. The other end of the lever is provided with a hammer for striking the bell K. $h$ represents a ratchet-tooth dial, turning upon a stud, $o$. Motion is given to the dial by a tooth on the circumference of the dial G. After this tooth has passed the dial $h$ the notched spring $j$ holds the small dial in position while the tooth on dial G is making its circuit.

In vertical section, Fig. 4, B represents the base, to which the register is screwed. A' represents the base of the instrument, which can be cast or otherwise constructed. When cast, the necessary standards for journals and supports can be cast thereto. K' is a socket projecting from the base and extending to the case A. The bell K is fixed to its upper end, and the shaft X is fitted to its interior, and kept within said socket by the bar $c'$, which passes through a slot in the socket's case. This slot determines the movement of the shaft X. A notched disk, E, is secured to the outer end of this shaft, and when the disk $b'$ is brought in contact with it, and when a rotary motion is given to the shaft Q, a reciprocating motion is imparted to shaft X. After the inclined surfaces have passed their highest point the spring $y$ forces the shaft X back to its original position. $g'$ is a slot on the rod $h$, for the purpose of allowing the disk $b'$ to be forced back upon the spring $i$, so that the two disks can be disengaged, thus allowing $b'$ and $h'$ to swing downward or outward, after which the register can be swung outward, for a purpose hereinafter described.

Fig. 6 is a back view of the base A'. L is a cover-plate, hinged to the base and locked with a combination-lock, $w$. M represents a cover-plate, which may be soldered to the base A'. This cover-plate covers a series of apertures in the base, and beneath the train of dials shown in Fig. 2.

Figs. 7 and 8 represent the registering apparatus, on a reduced scale, for the purpose of a hand or portable instrument.

Fig. 9 is a key for turning the cover-plate F to one side.

Fig. 10 is a vertical section of a registering apparatus. B' represents a support, to which the base B and register are attached. The base of the register A' is provided with two slotted posts, $m'$ $n'$. To these posts the levers $l'$ P' are pivoted. One end of $l$ rests within a slot or mortise in shaft X, while the other end lies across one end of lever P', while the other end of bar P' is connected to the reciprocating rod $t'$ by means of this slot and pin S'. $u'$ and $y'$ are guide-supports for the ends of the two rods, Q and $t$. The rod Q revolves upon its journal, while the rod $t$ reciprocates, or is forced back by means of the clutch $z'$ $w'$.

Fig. 12 is a wrench for revolving rod Q. Fig. 11 is a front view of the register, showing lever P' projecting from the back of the register and connected with the rod $t'$ by the pin $e'$.

Fig. 13 is a modification of the device for actuating the register shown in Fig. 10. Q represents the rod to be turned by a wrench, $w'$, being a ratchet-disk attached thereto, which operates the lever $s'$. B' represents a broken section of a car or partition, through which the rod projects, thereby enabling an operator to record a fare on the outside of the division-wall.

In Fig. 14 B represents the base of the instrument. H is a hub, to which the dial G is attached, and on which said dial turns. X represents a slotted reciprocating shaft within socket K'. K represents the bell which is secured to said socket K'. $c'$ represents the actuating-bar, with a projection fitting into slot $z$, which is of the proper length to determine the movement of said bar. To said bar the pawl $e$ is attached, for the purpose of engaging with the ratchet-wheel $d$ upon shaft J. $x$ represents a bearing for said shaft, said bearing being secured to the base of the instrument, and within the annular hub H. Said hub is turned by the small pinion on shaft J.

The operation will be described as follows: When a number is to be recorded the operator or conductor is to revolve the rod Q by means of the wrench Q' one-fourth of a revolution. This movement communicates a reciprocating movement to the rod $t$ by means of the V-shaped clutch $z'$ $w'$. To this rod a pin is attached, which is connected with the slot $s'$ in the lever P'. (See Fig. 10.) A forward and backward movement is given to this lever by the action of rod $t$, while the movement of lever P' is transmitted to lever $l'$. The opposite end of this lever, being connected to the reciprocating shaft X, communicates motion thereto. Thus, one-fourth of a revolution of rod Q transmits a downward movement to shaft X, while the spring $t''$ on rod $t'$ and spring $y$ causes a return movement of said shaft. The downward movement of this shaft carries the pawl $e$ with it. This pawl acts upon the ratchet-wheel $d$, which turns one tooth at each downward movement of shaft X and pawl $e$. This movement is transmitted to a beveled pinion, J, which has a number of teeth corresponding to those on the ratchet-wheel $d$. This pinion engages with cogs cut in the surface of the hub H. The number of teeth on said hub should equal the number of numerals upon the dial G, so that when a downward movement is given to shaft X an advance of one tooth is made on hub H, and the next higher number is seen through the aperture in the face of the register. As each number is recorded the bell K is rung by means of the lever I, which is pivoted on the pin or stud $i'$, the short arm of said lever being kept in contact with the ratchet-tooth by means of a spring, $c$, so that at every movement of the ratchet $d$ the short arm is thrown out until the contact ceases at the point of the tooth, after which the spring $c$ forces the lever violently back to its original position, and causes the hammer on the long arm of the lever to strike against the bell. The operation of registering, therefore, consecutive numbers on dial G continues to the end of the series, after which a new series begins; but simultaneously with the commencement of the new series the old series is transferred to another dial, $h$, which is provided with ten teeth on its circumference, and also ten divisions, which are provided with numerals corresponding to the highest number on dial G, and each succeeding highest number on said dial until dial $h$ has completed its revolution; consequently the highest number on dial $h$ is equal to the number of counts recorded in ten revolutions of dial G. The aperture through which the tally-figure is viewed upon dial $h$ is covered by cover-plate F, and in order to view the number the cover-plate is turned aside by a person who is in possession of a key for unlocking the same. This dial is intended to be used in conjunction with dial G as a trip-dial when used in public conveyances. If, at the end of a trip the number of registered fares is greater than shown on dial G, the number can be ascertained by turning aside the cover-plate and noting the number on dial $h$, to which add the number seen through the aperture in case A on dial G, and the sum will be the total amount for the trip. When two trips are made the difference between the first trip and the total for the two trips will equal the number of fares taken on the second trip. The difference between the total of any number of trips, minus the total for all trips preceding, will give the number of fares for the trip under consideration. The two dials $v$ and $u$ are each divided into ten spaces. Dial $u$ is numbered the same as dial $h$, while the lowest number on dial $v$ corresponds to the highest number on dial $u$; therefore each succeeding number on dial $v$ is greater than the preceding number, plus the highest number on dial $u$. This increase continues until the tenth period, when a change takes place from the highest to the lowest numeral.

We have in this register fifty numbers on dial G, although more or less can be adopted without departing from the principle. We have also on the dials $h$, $p$, and $u$ a series of corresponding numbers. The lowest number in each of these dials corresponds to the highest number on dial G; and, as we divide these dials into ten equal divisions, and one division is turned at each revolution of dial G, it will be observed that the numbers on each division of the dials $h$, $p$, and $u$ will be increased by the addition of the highest number on dial G. Therefore, as there are fifty numbers on dial G, there will be five hundred as the highest number on each of the three small dials; and as dial $v$ is actuated by dial $u$ to revolve it once around, it will be seen that the highest number on said dial will be ten times greater than that on dial $u$, or one hundred times greater than that on dial G. Therefore, the highest number on dial $v$ will be five thousand. Now, these two dials $v$ and $u$ are intended to keep a record of all fares or numbers recorded by dial G during a day or other interval of time.

These dials are not to be inspected by the party who operates the register, nor is it intended to be inspected by the person who holds the key to cover-plate F and inspects dial $h$; but it should be inspected by some party interested in the profits accruing from the use of said registry—as, for instance, the president of a corporation, who should possess the key for unlocking the register and swinging it out upon its hinges—after which the cover-plate L is opened by unlocking the combination-lock $w$. Thus a view is obtained through the opening $w'$ in the base of the register $A'$ of the figures on the dials. The figures added to those seen through the aperture in case A on dial G will be the exact number recorded during the day or any other interval of time that may be designated. Now, the numbers taken by the inspectors during said interval of time from dials $h$ and G should correspond with the record given by dials $u$ and $v$, and also the amount of money taken in any given time, divided by the price per fare, should equal the numbers recorded on the above-said dials.

In order to provide for further protection against peculation we employ a system or train of dials, as shown in Fig. 2, $p$ $q$ $r$ $s$ $t$.

The hub H is provided with a pin or cog, which actuates dial $p$ and turns it one-tenth of a revolution at every revolution of said hub. Thus the total number of counts made in ten revolutions by dial G are shown on the tenth movement of dial $p$. Now, the highest number is transmitted on the eleventh revolution of dial G to dial $q$, where it becomes said dial's lowest number. We now have, as seen through the apertures in the back of this register, five hundred recorded on dial $q$, fifty on dial $p$, and one on dial G, making five hundred and fifty-one counts made. As dial $q$ moves but one-tenth of a revolution to a complete revolution of dial $p$, it will be observed that each movement of dial $q$ records an additional five hundred, so that at its tenth movement five thousand will be recorded. This number will be the lowest on dial $q$. Consequently, as the ratio of increase is in proportion to the number of dials employed, dial $t$ will record for its highest number five millions.

This system of dials is intended to be inspected by the proprietor or proprietors, or their authorized agents, and by officers of an organized company.

The numbers seen upon these dials at any time should correspond to those taken from $h$ G $u$ $v$, and also when a certain amount of money is received for each number recorded the highest number multiplied by said fare should correspond to the money taken at any given interval of time between said inspections.

The above series or train of dials is covered by a plate, which can be soldered to the back of the register, and removed again by the application of a hot iron when an inspection is required.

What we desire to secure by Letters Patent is—

1. A reciprocating shaft or rod, X, working in socket K', bar $c'$, working in slot $z$ in said socket, pawl $e$, and spring $y$, in combination with ratchet-wheel $d$, pinion J, gear-wheel H, and dial G, for the purpose specified.

2. The annular journal $g$, projecting from the base of the register, and the annular toothed hub or gear wheel H, with registering-dial G attached and secured thereto, in combination with the pinion and shaft J, with ratchet-wheel $d$ thereon, and the actuating mechanism by which said hub or wheel and dial G is made to revolve.

3. Bell K, mounted on socket K', shaft X, bar $c'$, pawl $e$, and ratchet-wheel $d$, in combination with lever I and spring $c$, as arranged, and for the purpose specified.

4. The auxiliary base B, provided with apertures and recesses therein, for the purpose of receiving the projecting actuating parts of the register, and the cover-plates L and M, in combination with the hinge C, for hinging said register to said base, whereby said register can be swung from said base, when required, to inspect the figures on the dials beneath said cover-plates.

5. In combination with the hub or wheel H, and the registering-dial G therewith, each being provided with actuating-teeth thereon, the dials $u$ and $h$, and apertures $v'$ and F, within the face and back of a registering-machine, whereby the numerals upon the face of said dials are seen.

6. In combination with the dial G, annular hub or wheel H, and the actuating mechanism, substantially as arranged, the dial $h$ actuated from the circumference of said dial G, and dials $u$ and $v$, and the train of dials $p\ q\ r\ s\ t$, arranged beneath dial G, and between the actuating hub or wheel H, and the circumference of a registering-machine, substantially as shown, and for the purpose described.

7. In combination with the annular gear-wheel H, with dial G thereon, substantially as shown, pinion and shaft J, ratchet-wheel $d$, and pawl $e$, the detent $l$, and spring $m$, for the purpose of preventing a return movement of the dial, as arranged, and for the purpose herein set forth.

8. The reciprocating bar or rod $t'$, with clutch $w'$ and actuating-spring $t''$ thereon, in combination with the rocking or revolving rod Q, provided with actuating-clutch $z'$ for imparting a reciprocating motion to rod $t'$ and lever P′ and $l'$, whereby the registering mechanism is actuated.

9. The rod Q, clutch $w'\ z'$, and rod or bar $t'$, in combination with the lever P′ and $l'$, and actuating reciprocating rod X, with actuating-bar $c'$ thereon, provided with pawl $e$, for imparting motion given by rod Q to the ratchet-wheel $d$, whereby hub or wheel H, with dial G thereon, is made to revolve.

10. The reciprocating rod X, bar $c'$, pawl $e$, and ratchet-wheel $d$, in combination with pinion J and wheel H, as and for the purpose specified.

11. In combination with the base A′ of a registering-machine, the socket K′ provided with slot $z$ therein, said socket and slot being for the purpose of receiving and guiding the actuating-rod X and actuating-bar $c'$.

12. The spring $y$ around the socket K′, in combination with the bar $c'$, pawl $e$, and reciprocating rod X within said socket, as arranged, and for the purpose set forth.

13. The reciprocating shaft X projecting through the base A′, and lever $l'$, connected to the end projecting through said base, in combination with said base A and socket K′, substantially as and for the purpose described.

14. The single annular journal $g$, and annular gear-wheel H thereon, provided with a registering-dial, G, which extends beyond the circumference of said gear-wheel, for the purpose described, in combination with socket K, journal-bearing $x$, studs $b, f, i$, and $c$, and the necessary actuating and moving parts connected thereto and therewith, and all arranged within the annular journal $g$ and gear-wheel H, for the purpose specified.

LEWIS B. HUNT.
JAMES PRESTON.

Witnesses:
ALBERT L. MILLER,
L. E. G. RADDE.